J. E. WYCKOFF.
BEET HARVESTER.
APPLICATION FILED MAY 29, 1920.

1,390,663.

Patented Sept. 13, 1921.
2 SHEETS—SHEET 1.

Inventor
Joseph E. Wyckoff
by Nestall and Nallau
his Attorneys

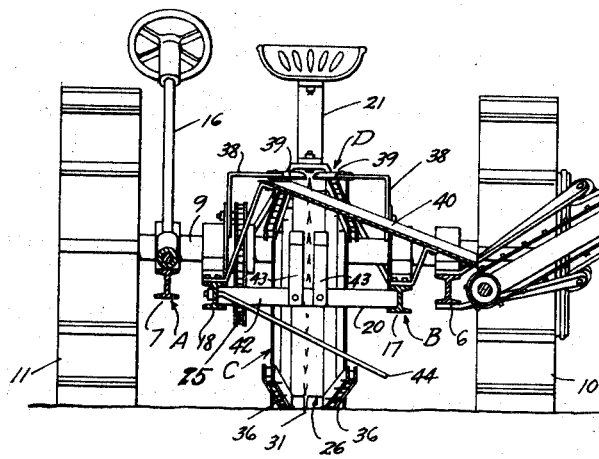
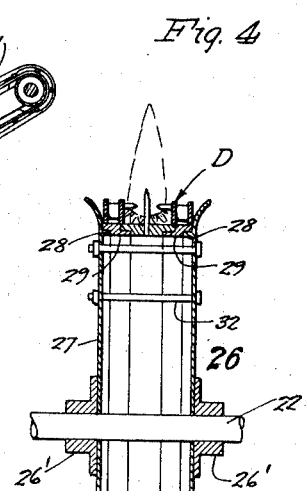
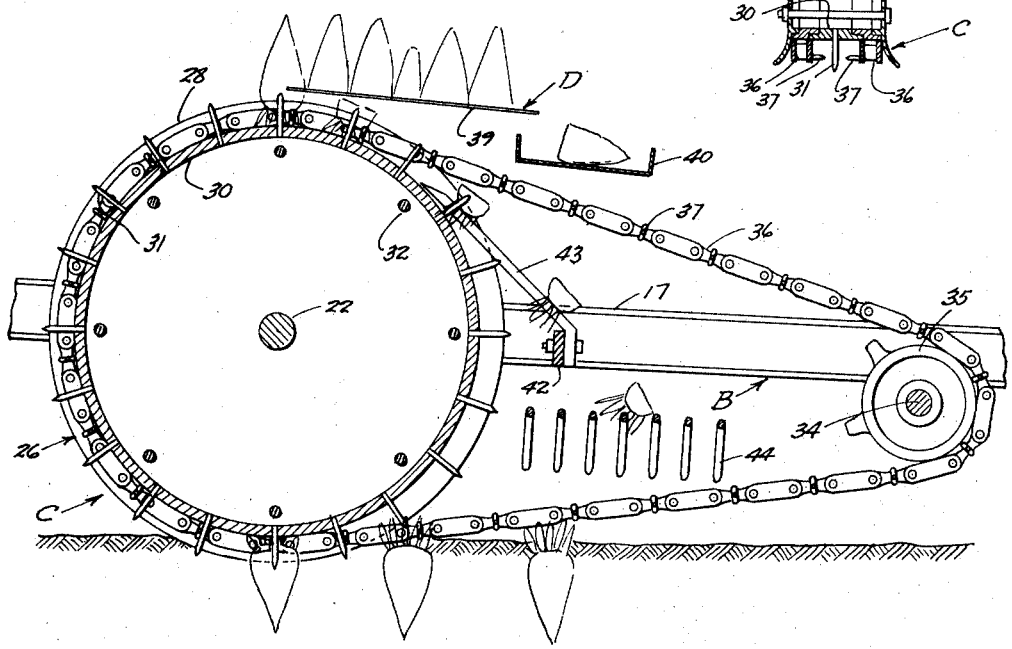

UNITED STATES PATENT OFFICE.

JOSEPH E. WYCKOFF, OF LOS ANGELES, CALIFORNIA.

BEET-HARVESTER.

1,390,663.  Specification of Letters Patent.  Patented Sept. 13, 1921.

Application filed May 29, 1920. Serial No. 385,107.

*To all whom it may concern:*

Be it known that I, JOSEPH E. WYCKOFF, a citizen of the United States, residing at Los Angeles, in the county of Los Angeles and State of California, have invented new and useful Improvements in a Beet-Harvester, of which the following is a specification.

This invention pertains to a machine for harvesting beets and other plants of a like character, and is designed to provide a machine which will remove the beet root and its top from the ground, securely hold the same and convey it to a device for removing the tops.

The objects of this invention are first, to provide means for pulling the beets, said means riding on the ground over the row of beets, pressing down upon the soil at the sides of the beets, then grasping individual beets, pulling them from the soil and securely holding them while they are being raised to the topper; and second, to provide a topper coöperating with the grasper so that the tops of the beets are removed while being held by the grasper, and then released to be delivered to a selected place; and third, to provide details of structure, whereby an efficient, durable, easily manipulated machine, certain in operation is obtained.

Figure 1:
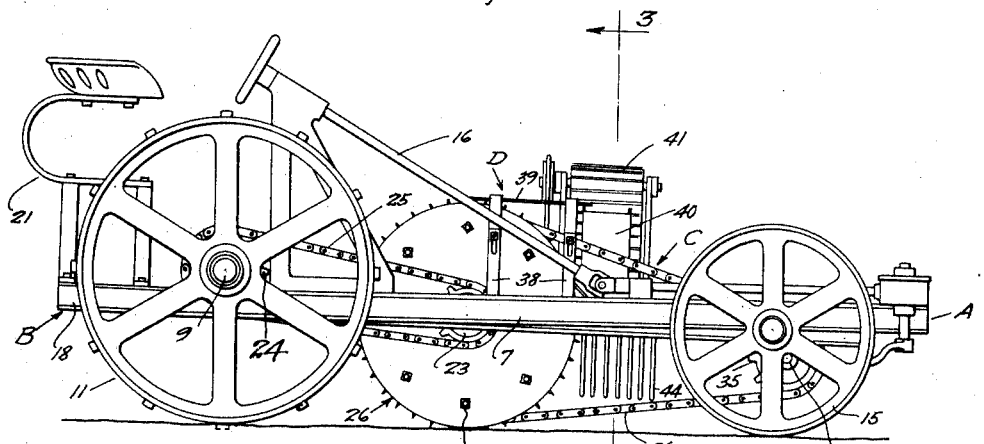
Figure 2:
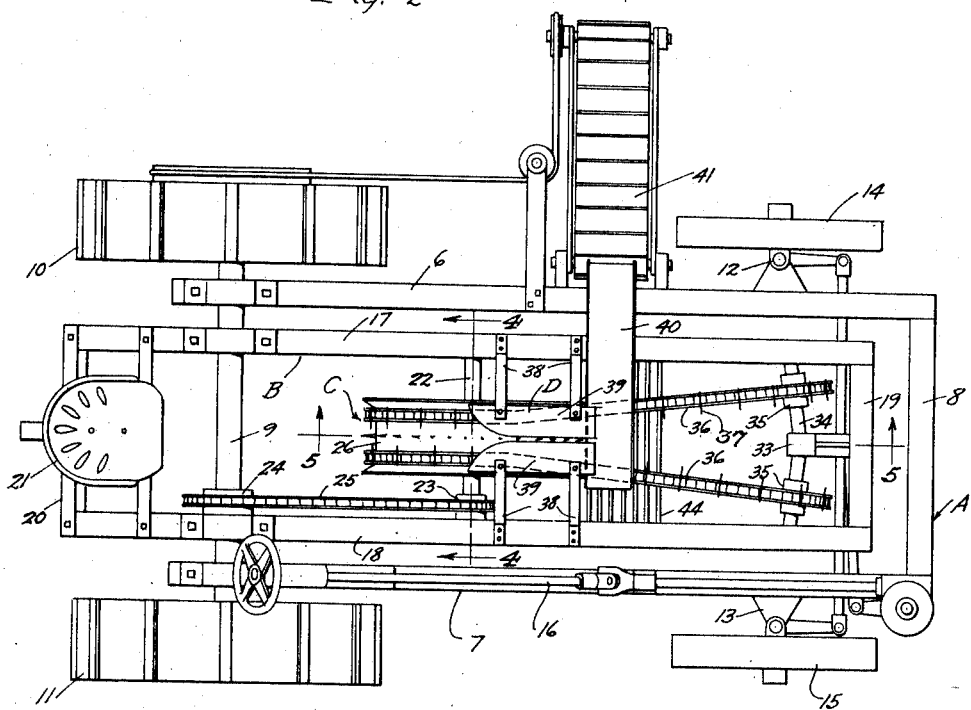

These objects together with other objects and corresponding accomplishments are obtained by means of the embodiment of my invention illustrated in the accompanying drawing, in which:

Figure 1 is a side elevation of a beet harvester; Fig. 2 is a plan view; Fig. 3 is a section taken on the line 3—3 of Fig. 1; Fig. 4 is a section taken on the line 4—4 of Fig. 2; and Fig. 5 is an enlarged section taken on the line 5—5 of Fig. 2.

Referring more particularly to Figs. 1, 2, and 3, a chassis is indicated by A. Pivotally mounted upon the chassis is a frame B, which carries the grasper mechanism indicated generally by C. The topper is indicated by D.

The chassis comprises a frame including side bars 6 and 7 connected at the front by a bar 8. Journaled upon the side bars adjacent the rear end thereof is an axle 9 having fixedly secured to the ends thereof ground wheels 10 and 11. Adjacent the front end of the side bars are steering knuckles 12 and 13 having the front ground wheels 14 and 15 mounted upon the spindles thereof. The steering mechanism may be of any well known type, such as is used in automobiles, and is indicated by 16. As this steering mechanism forms no part of my invention and is well known in the art, it is not necessary to describe the details thereof.

Frame B includes side bars 17 and 18 pivotally mounted adjacent their rear ends upon axle 9. Securing the side bars 17 and 18 together at the front thereof is a bar 19. A similar bar 20 connects the side bars at the rear. Suitably supported upon the rear of the frame is a seat indicated generally by 21. The seat serves for the operator of the machine, and his weight acts as a counterbalance for the moment of the front part of the frame B.

Journaled in the frame B at about the center thereof is a shaft 22. Fixedly secured to the shaft is a sprocket wheel 23. Fixed to axle 9 in line with sprocket wheel 23 is a sprocket wheel 24. Wheels 23 and 24 are geared together by means of a sprocket chain 25. This provides for positively driving the shaft 22 from the axle 9.

The grasper comprises a grooved wheel or sheave 26 secured to shaft 22, and is best shown in Figs. 4 and 5. Hubs 26' are fixed to the shaft 22. Secured to each hub 26' is a disk 27 dished outwardly at its periphery to provide shrouds. An annular shoulder is formed on each of the disks on the inner side and is arranged to form a scarf joint with a ring 29. Interposed between rings 29 is a ring 30 connected thereto by scarf joints. Projecting radially from the ring 30 are spikes 31. The disks 27, rings 29, and ring 30 are assembled and held together by means of bolts 32. This construction provides for assembling a sheave with rings 29 of various widths, and thereby obtaining a sheave of any desired width. This is advantageous to accommodate the machine to beets of various sizes.

Secured to the front of the frame B is a bracket 33, upon which is mounted a shaft 34 bent at the center to provide journals inclined from the bracket toward the rear. Rotatably mounted upon the shaft 34 adjacent the ends are sprocket wheels 35, which are spaced from each other at a distance greater than the width of the grasper sheave. Passing over each wheel 35 is a grasper chain 36. By reason of the position of the wheels 35, the chains 36 will approach each other being crowded by the wheel 26. Disposed on the chains are tines 37 extending inwardly toward each other. It will be noted that the frame B and its parts are supported by the sheave 26 which rides upon the ground.

Extending upwardly from the side bars 17 and 18 of the frame B are standards 38. There is a pair of standards upon each side and they are bent inwardly at the top. Each pair of standards has a knife 39 secured thereto, the edges facing the other, but spaced to form in effect a boot-jack shaped knife. The standards may be made adjustable as to height, so as to position the knife or topper at such distance from the periphery of the sheave 26 as is desired in conformity with the size and nature of the beets being harvested.

A chute 40 is mounted on the frame B with its intake end below the rear of the topper. This chute extends downwardly and discharges upon an elevator 41, which may be of any well known type of construction. As the details of this elevator are not material to the invention, they will not be described. The elevator merely serves for the purpose of receiving the beets from the chute and delivering them to some receptacle or discharging them elsewhere.

A cross bar 42 extends between the side bars of frame B and has mounted thereon fingers 43 spaced on each side of the spikes on sheave 26 so that the beet tops will be lifted from the spikes and discharged upon a grating 44, which directs them to one side out of the way of the sheave 26.

The machine is directed over a row of beets with the chains 36 on each side thereof. As the sheave 26 approaches the beets, the chains 36 crowd toward each other, and grasp the roots as the sheave rides thereover. The weight of the sheave forces it down over the beets, the shrouds entering the soil on each side thereof. The tines 37 enter the beets from each side, and spikes 31 penetrate the beets from the top. Thus the beets are firmly gripped and pulled from the ground, they are then carried upwardly to the topper as best shown in Fig. 5. The top is severed as the beet is forced against the knife blades and the top carried on until the fingers 43 lift the top from the sheave. The tops are then discharged over the grating 44 to the ground. The beet portions which are cut from the sheave are pushed along the topper and fall into the chute 40, rolling down to the elevator, and are carried thereby to the point of delivery. It is obvious that my invention is not limited to the use of chains but their equivalents may be used.

What I claim is:

1. In a harvester, a grasper comprising a sheave arranged to ride on the ground, a pair of endless grasper chains passed over said sheave and disposed in the groove thereof, means over which said chains are passed to separate them, whereby the chains approach each other toward one bight and recede from the other toward the other bight, and inwardly directed tines on said chains for penetrating the plants to be harvested as the sheave passes over them.

2. In a harvester, a grasper comprising a sheave having radially extending spikes in the groove thereof arranged to ride on the ground, a pair of endless grasper chains passed over said sheave and disposed in the groove thereof, means over which said chains are passed to separate them, whereby the chains approach each other toward one bight and recede from each other toward the other bight, and inwardly directed tines on said chain for penetrating the plants to be harvested as the sheave passes over them.

3. In a harvester, a grasper comprising a sheave arranged to ride on the ground, a pair of endless grasper chains passed over said sheave and disposed in the groove thereof, spaced wheels over which said chains pass to separate them on both sides, whereby the chains approach each other toward one bight and recede from each other toward the other bight, and inwardly directed tines on said chains for penetrating the plants to be harvested.

4. In a harvester, a grasper comprising a sheave having radially extending spikes in the groove thereof arranged to ride on the ground, a pair of endless grasper chains passed over said sheave and disposed in the groove thereof, spaced wheels over which said chains pass to separate them on both sides, whereby the chains approach each other toward one bight and recede from each other toward the other bight, and inwardly directed tines on said chains for penetrating the plants to be harvested.

5. In a harvester, a grasper comprising a sheave arranged to ride on the ground, a pair of endless grasper chains passed over said sheave and disposed in the groove thereof, means over which said chains are passed to separate them, whereby the chains approach each other toward one bight and recede from each other toward the other bight, inwardly directed tines on said chains for penetrating the plants to be harvested, and means to cut the plant tops from the roots disposed over the top of the chains at the bight where the chains recede in their travel.

6. In a harvester, a grasper comprising a sheave having radially extending spikes in the groove thereof arranged to ride on the ground, a pair of endless grasper chains passed over said sheave and disposed in the groove thereof, means over which said chains are passed to separate them, whereby the chains approach each other toward one bight and recede from each other toward the other bight, inwardly directed tines on said chains for penetrating the plants to be harvested, and means to cut the plant tops from the roots disposed over the top of the chains at the bight where the chains recede in their travel.

7. In a harvester, a grasper comprising a sheave arranged to ride on the ground, said sheave being adjustable as to width, a pair of endless grasper chains passed over said sheave and disposed in the groove thereof, means over which said chains are passed to separate them, whereby the chains approach each other toward one bight and recede from each other toward the other bight, and inwardly directed tines on said chains for penetrating the plants to be harvested.

8. In a harvester, a grasper comprising a sheave having radially extending spikes in the groove thereof arranged to ride on the ground, said sheave being adjustable as to width, a pair of endless grasper chains passed over said sheave and disposed in the groove thereof, means over which said chains are passed to separate them, whereby the chains approach each other toward one bight and recede from each other toward the other bight, and inwardly directed tines on said chain penetrating the plants to be harvested.

In witness that I claim the foregoing I have hereunto subscribed my name this 19th day of May, 1920.

JOSEPH E. WYCKOFF.